United States Patent [19]
McConnell et al.

[11] Patent Number: 5,823,260
[45] Date of Patent: Oct. 20, 1998

[54] WELL SCREEN

[75] Inventors: Howard T. McConnell; Robert D. Whitworth, both of Spring, Tex.

[73] Assignee: Houston Well Screen Company, Houston, Tex.

[21] Appl. No.: 718,813

[22] Filed: Sep. 24, 1996

[51] Int. Cl.[6] .................................................. E21B 43/08
[52] U.S. Cl. .......................................... 166/230; 166/234
[58] Field of Search ................................... 166/228, 230, 166/234, 236

[56] References Cited

U.S. PATENT DOCUMENTS

| 4,613,350 | 9/1986 | Forester et al. | 65/2 |
| 5,624,560 | 4/1997 | Joll et al. | 166/230 X |

Primary Examiner—William P. Neuder
Attorney, Agent, or Firm—Vaden, Eickenroht & Thompson, L.L.P.

[57] ABSTRACT

A well screen is disclosed for positioning in a well bore to screen solid particles from the fluid produced by the well comprising a base pipe, a portion of the wall of which is perforated, and having threaded connections for connecting the base pipe into a pipe string, a wire screen surrounding the perforated portion of the base pipe, a thin porous membrane comprising two layers of woven cloth of ceramic fibers wrapped around the wire screen, means for holding the ends of the porous cloth membrane in sealing engagement with the base pipe, and a perforated tubular metal shroud surrounding the woven ceramic cloth membrane to protect the membrane from damage when lowered into a well bore.

4 Claims, 2 Drawing Sheets

WELL SCREEN

This invention relates to well screens generally, and in particular, to well screens using thin, porous, flexible, membranes to screen solid particles from the well fluids flowing through the screens into a well bore.

Recently Pall Well Technology came on the market with a new well screen under the trademark STRATAPAC™ DOWNHOLE MEMBRANES. The screen includes an inner perforated base pipe covered by a drainage mesh, which, in turn is covered by four layers of Pall PMM® medium, which is described as being stainless steel powder sintered with a pore structure of stainless steel woven wire mesh. This screen is described in U.S. Pat. No. 4,436,635, issued Mar. 13, 1984, entitled "Porous Metal Article and Method of Making".

Also, U.S. Pat. No. 4,858,691, which issued Aug. 22, 1989 and is assigned to Baker Hughes Incorporated, describes a well screen that employs a wire mesh of woven metal wire positioned between a perforated inner tubular member and either a wire wrapped screen or a perforated cylindrical member.

It is an object and feature of this invention to provide an improved thin porous, flexible membrane for use in well screens to remove all but the smallest of particles from the well fluid flowing through the membrane and a well screen that includes such a membrane.

A further object and feature of this invention is to provide an improved well screen that employs, as such a porous membrane, a cloth made by weaving fibers of inert material.

It is another object and feature of this invention to provide a well screen that includes a layer of woven fibers of inert material to provide a porous membrane that will screen extremely fine particles from the fluid flowing into a well bore.

A further object and feature of this invention is to provide a porous membrane for use as a component of a well screen that consists of an elongated cloth woven from continuous ceramic fibers of alumina-boria-silica that is wrapped around a supporting screen for assembly in a well screen.

It is another object and feature of this invention to provide a tubular screen for use in oil, gas, and water wells that includes a porous membrane comprising two layers of cloth made of woven ceramic threads that are wrapped around a metal supporting screen.

It is a further object and feature of this invention to provide such a porous membrane where the edges of each wrap overlap and the overlaps of each layer are spaced apart.

These and other objects, advantages, and features of this invention will be apparent to those skilled in the art from a consideration of this specification, including the attached drawings and appended claims.

IN THE DRAWINGS

Figure 1:
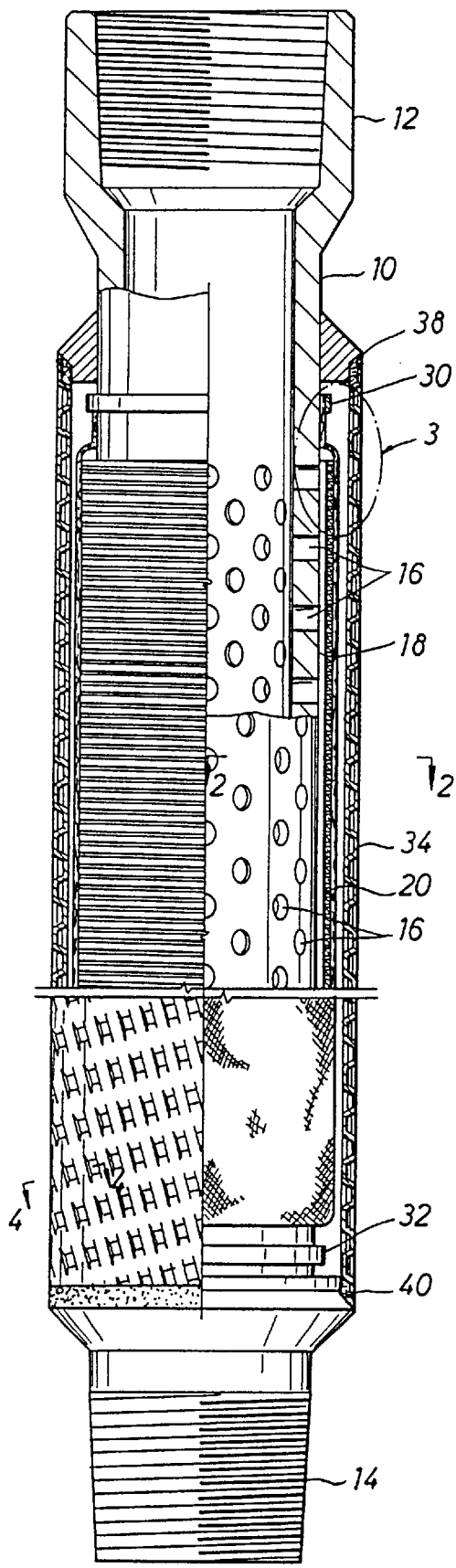
FIG. 1 is a view partly in elevation and partly in section of the well screen of this invention.
Figure 2:
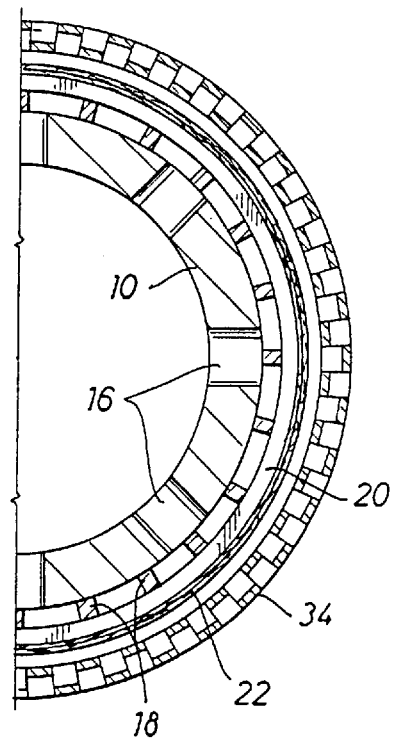
FIG. 2 is a sectional view, on an enlarged scale, taken along line 2—2 of FIG. 1.

The well screen of FIG. 1 includes base pipe 10 having a section between box 12 attached to one end and pin 14 at the other end that is provided with a plurality of spaced perforations 16. Formed around base pipe 10 is a conventional screen formed by wrapping wire around the outside of the base pipe. In the particular embodiment shown, the screen is a wire-based screen that includes a plurality of spaced parallel rods 18 that extend longitudinally along the outside of the base pipe around which trapezoidal-shaped wire 20 is wrapped in spaced coils. The wire is welded to the rods in accordance with the method taught in U.S. Pat. No. 4,314,129 that issued Feb. 2, 1982 to Wilson, et al. and is assigned to the assignee of this application.

In accordance with this invention, the rod base screen is covered by a porous membrane 22 made up of two wraps of ceramic cloth 24 and 26 made of woven fibers of ceramic material, such as alumina-boria-silica fibers. The cloth is applied to the well screen at an angle for pore openings and strength in case the screen collapses in a downhole situation. This configuration also enables flow after collapse.

Figure 3:
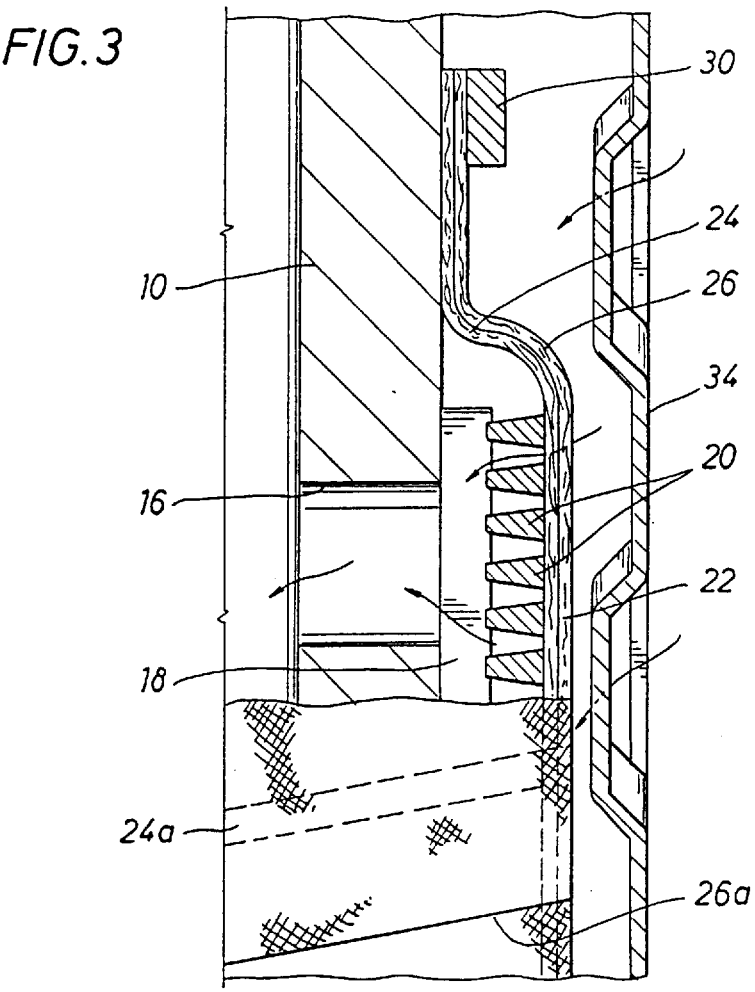
FIG. 3 is a view on an enlarged scale of the portion of FIG. 1 within circle 3.
Figure 4:
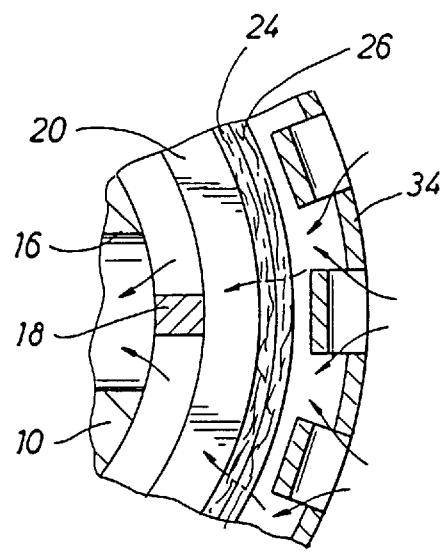
FIG. 4 is a sectional view on an enlarged scale taken along line 4—4 of FIG. 1.

All edges of each wrap of the woven ceramic cloth overlap, as shown in FIG. 3. The second layer of woven ceramic cloth 26 is wrapped with overlap 26a staggered from overlap 24a of an inner layer of woven material 24 to assure complete coverage without coinciding laps of the first and second layers. All fluid entering the base pipe must travel through the porous woven cloth so that all fluid entering the base pipe will have most of the solid particles screened from it by the cloth. The ends of the two layers of ceramic cloth are secured to the base pipe by clamps 30 and 32, as shown in FIG. 3.

To protect the ceramic cloth from damage as the screen is handled at the surface and as it is run into the well bore, outer shroud 34 is positioned over the woven ceramic cloth sleeves. The shroud is mounted on the base pipe and attached to the base pipe by welds 38 and 40, which connect the shroud to mounting rings 42 and 44. The shroud is a tubular member in which louvers 46 are formed to allow fluid from the producing formation to flow from the well bore through the shroud and then to pass through layers 24 and 26 of woven ceramic cloth where all but the smallest solid particles are screened from the fluid before it enters perforated base pipe or mandrel 10. In the embodiment shown, the louvers are spaced along a line diagonal to the longitudinal axis of the base pipe.

Flow tests were performed on the screen of this invention by independent testing companies. Sand retention tests resulted in a rating of 80 microns. Permeabillity was determined to be 39.82 Darcy with the pressure drop across the screen at a flow rate of 140 bpd/ft. at 1.68 psi.

The screen tested comprised a base pipe (10) of 2⅞" O.D., 6.4 lb/ft. tubing with an I.D. of 2.441". The inner screen included spaced parallel rods (18), 0.060" in diameter, and wire (20), trapezoidal in cross-section and 0.060" in height, wrapped around the rods, two layers of woven ceramic cloth having an O.D. of 3.195" stretched over rod based screen 18, and louvered outer shroud (34) having an O.D. of 3.595".

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A rod-based well screen for positioning in a well bore to screen solid particles from the fluid produced by the well comprising a base pipe, a portion of the wall of which is perforated, and having threaded connections for connecting the base pipe into a pipe string, a wire screen surrounding the perforated portion of the base pipe, a thin porous membrane, formed by a layer of cloth made of woven ceramic fibers, that is wrapped around the wire screen to filter particles out of well fluid passing through the woven ceramic cloth before the fluid enters the base pipe, means for holding the ends of the ceramic cloth membrane in sealing engagement with the base pipe, and a perforated tubular metal shroud surrounding the ceramic cloth membrane to protect the membrane from damage as the screen is lowered into a well bore.

2. The well screen of claim 1 in which the cloth of the membrane is woven from continuous alumina-boria-silica fibers.

3. A well screen having a sand retention rating of 80 microns and a permeability of about 39 Darcy with a pressure drop across the screen at a flow rate of 140 bpd/ft. of about 1.68 psi for positioning in a well bore to screen solid particles from the fluid produced by the well comprising a base pipe, a portion of the wall of which is perforated, said base pipe having threaded connections for connecting the base pipe into a pipe string, a wire screen surrounding the perforated portion of the base pipe, a thin porous membrane, formed by a layer of cloth made of woven ceramic fibers, that is wrapped around the wire screen to filter particles out of well fluid passing through the woven ceramic cloth before the fluid enters the base pipe, means for holding the ends of the ceramic cloth membrane in sealing engagement with the base pipe, and a perforated tubular metal shroud surrounding the ceramic cloth membrane to protect the membrane from damage as the screen is lowered into a well bore.

4. A well screen for positioning in a well bore to screen solid particles from the fluid produced by the well comprising a base pipe, a portion of the wall of which is perforated, said base pipe having threaded connections for connecting the base pipe into a pipe string, a wire screen surrounding the perforated portion of the base pipe, a thin porous membrane comprising two layers of woven ceramic fiber cloth wrapped around the wire screen with each layer having overlapping edges with the overlaps of each wrap spaced apart longitudinally along the screen at an angle to the longitudinal axis of the screen to filter particles out of well fluid passing through the woven ceramic cloth before the fluid enters the base pipe, means for holding the ends of the ceramic cloth membrane in sealing engagement with the base pipe, and a perforated tubular metal shroud surrounding the ceramic cloth membrane to protect the membrane from damage as the screen is lowered into a well bore.

* * * * *